US012662984B2

(12) United States Patent (10) Patent No.: US 12,662,984 B2
Graziano et al. (45) Date of Patent: Jun. 23, 2026

(54) SYSTEMS AND METHODS FOR ADAPTIVELY MANAGING ENGINE KNOCKING

(71) Applicant: Caterpillar Inc., Peoria, IL (US)

(72) Inventors: Michael T. Graziano, Washington, IL (US); Brett A. Zook, Lafayette, IN (US); Kyle Williams, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/819,514

(22) Filed: Aug. 29, 2024

(65) Prior Publication Data

US 2026/0063099 A1     Mar. 5, 2026

(51) Int. Cl.
*F02P 5/15* (2006.01)
*F02D 35/02* (2006.01)
*F02P 5/152* (2006.01)
*G01L 23/22* (2006.01)

(52) U.S. Cl.
CPC .......... *F02P 5/1522* (2013.01); *F02D 35/027* (2013.01); *G01L 23/225* (2013.01); *F02D 35/023* (2013.01)

(58) Field of Classification Search
CPC .... F02P 5/1522; G01L 23/225; G01L 23/221; F02D 35/027; F02D 35/028; F02D 41/008; F02D 35/023
See application file for complete search history.

(56) References Cited

U.S. PATENT DOCUMENTS

| | | | |
|---|---|---|---|
| 4,243,007 A | 1/1981 | Ehrhardt et al. | |
| 4,574,758 A | 3/1986 | Yagley | |
| 4,829,962 A | 5/1989 | Hafner et al. | |
| 4,860,711 A * | 8/1989 | Morikawa | F02D 35/023 |
| | | | 123/48 D |
| 4,993,371 A | 2/1991 | McDougal et al. | |
| 5,133,322 A | 7/1992 | McDougal et al. | |
| 5,522,254 A * | 6/1996 | Kamabora | G01L 23/225 |
| | | | 73/114.07 |
| 2014/0366842 A1 * | 12/2014 | Tanaka | F02D 35/027 |
| | | | 123/435 |
| 2021/0079882 A1 * | 3/2021 | Hsieh | F02D 41/1402 |

FOREIGN PATENT DOCUMENTS

| | | | |
|---|---|---|---|
| JP | 2002061524 A | * | 2/2002 |
| JP | 2011012569 A | * | 1/2011 |

* cited by examiner

*Primary Examiner* — Syed O Hasan

(57) ABSTRACT

In one instance, disclosed herein is an engine system, comprising: an engine comprising a plurality of engine cylinders; and a controller operative to: control a respective ignition timing for each engine cylinder of the plurality of engine cylinders; detect an increase of a knock intensity of the engine; after detecting the increase of the knock intensity of the engine, compare the knock intensity of the engine to a threshold knock intensity; if the knock intensity of the engine is greater than the threshold knock intensity, retard the respective ignition timing for each engine cylinder of the plurality of engine cylinders by the same amount; and if the knock intensity of the engine is less than the threshold knock intensity, retard a first ignition timing of a first engine cylinder by a first amount independently of a second ignition timing of a second engine cylinder.

20 Claims, 4 Drawing Sheets

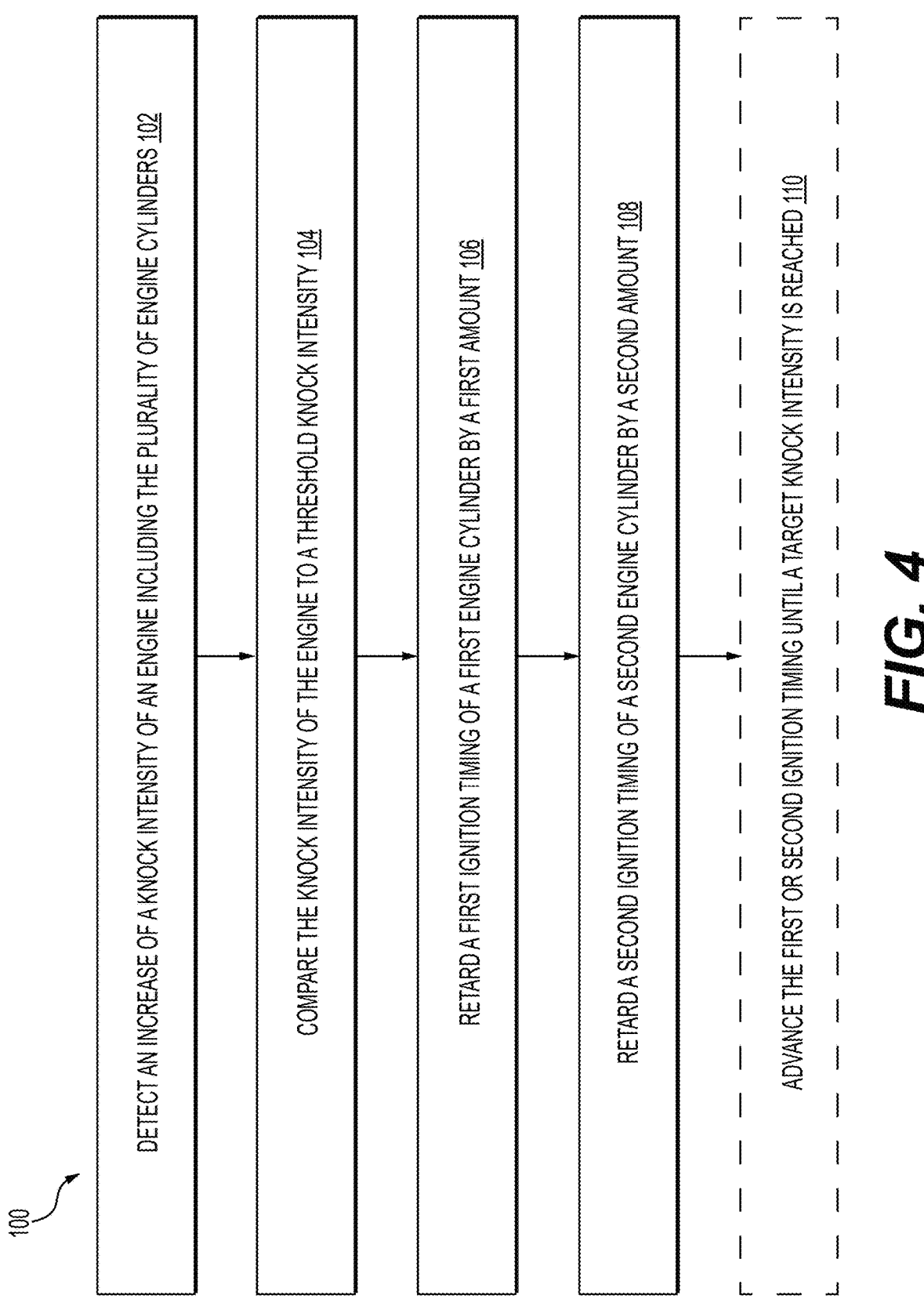

DETECT AN INCREASE OF A KNOCK INTENSITY OF AN ENGINE INCLUDING THE PLURALITY OF ENGINE CYLINDERS 102

COMPARE THE KNOCK INTENSITY OF THE ENGINE TO A THRESHOLD KNOCK INTENSITY 104

RETARD A FIRST IGNITION TIMING OF A FIRST ENGINE CYLINDER BY A FIRST AMOUNT 106

RETARD A SECOND IGNITION TIMING OF A SECOND ENGINE CYLINDER BY A SECOND AMOUNT 108

ADVANCE THE FIRST OR SECOND IGNITION TIMING UNTIL A TARGET KNOCK INTENSITY IS REACHED 110

SYSTEMS AND METHODS FOR ADAPTIVELY MANAGING ENGINE KNOCKING

TECHNICAL FIELD

The present disclosure relates generally to internal combustion engines, and more particularly, to methods and systems for adaptively managing knocking within an internal combustion engine.

BACKGROUND

An internal combustion engine (ICE) includes one or more engine cylinders. Each engine cylinder is coupled to an assembly of components, such as an intake valve, an exhaust valve, a fuel injector, a spark plug, and a piston, that function cooperatively to execute an engine cycle. The engine cycle may include one or more stages (e.g., strokes) for receiving and/or combusting a fuel (e.g., a gaseous fuel such as natural gas), providing torque to a drive train, and expelling exhaust. The operation of the components and/or the execution of the engine cycle may be carefully orchestrated for the ICE to operate safely and efficiently.

For example, the engine cycle may include four strokes: 1) an intake stroke, in which the piston moves toward the bottom of a combustion chamber formed by the engine cylinder and air is allowed to enter the combustion chamber; 2) a compression stroke, in which the piston moves toward the top of the combustion chamber and the contents of the combustion chamber are compressed; 3) a power stroke, in which fuel within the combustion chamber is ignited and the piston is driven back toward the bottom of the combustion chamber by the combustion of the fuel; 4) and an exhaust stroke, in which the piston again moves toward the top of the combustion chamber and exhaust produced by the combustion of the fuel is expelled from the combustion chamber. In order to produce torque most efficiently, the fuel within the combustion chamber is ignited by the spark plug immediately before the piston reaches the top of the combustion chamber, creating a flame front that grows in a controlled manner and ultimately consumes nearly all of the fuel contained within the combustion chamber. However, if subjected to sufficient heat and/or pressure, fuel contained within the combustion chamber that is not consumed by the flame front may detonate and/or burn in an uncontrolled manner, a phenomenon referred to as knocking. Knocking may cause damage to the engine and/or force the engine to shut down.

An ignition system for spark-ignited internal combustion engines is disclosed in U.S. Pat. No. 4,243,007 (the '007 patent) to Ehrhardt et al. The system described in the '007 patent detects knocking within an engine and retards the ignition timing of individual engine cylinders in response to the detected knocking. The '007 patent does not disclose methods or systems including comparing a knock intensity of an engine to a threshold knock intensity and adjusting ignition timings of a plurality of engine cylinders of the engine collectively or individually based on the comparison of the knock intensity of the engine to the threshold knock intensity.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, an engine system includes an engine comprising a plurality of engine cylinders; and a controller operative to: control a respective ignition timing for each engine cylinder of the plurality of engine cylinders; detect an increase of a knock intensity of the engine; after detecting the increase of the knock intensity of the engine, compare the knock intensity of the engine to a threshold knock intensity; if the knock intensity of the engine is greater than the threshold knock intensity, retard the respective ignition timing for each engine cylinder of the plurality of engine cylinders by the same amount; and if the knock intensity of the engine is less than the threshold knock intensity, retard a first ignition timing of a first engine cylinder of the plurality of engine cylinders by a first amount independently of a second ignition timing of a second engine cylinder of the plurality of engine cylinders.

In another aspect, an engine controller includes a processor and a memory storing instructions for causing the processor to: detect an increase of a knock intensity of an engine; after detecting the increase of the knock intensity of the engine, compare the knock intensity of the engine to a threshold knock intensity; if the knock intensity of the engine is greater than the threshold knock intensity, retard a respective ignition timing for each engine cylinder of a plurality of engine cylinders included in the engine by a first amount; and if the knock intensity of the engine is less than the threshold knock intensity, retard a first ignition timing of a first engine cylinder of the plurality of engine cylinders by a second amount that is less than the first amount.

In another aspect, a method for controlling an engine includes detecting an increase of a knock intensity of the engine; and collectively retarding a respective ignition timing for each engine cylinder of a plurality of engine cylinders included in the engine, wherein a first ignition timing of a first engine cylinder of the plurality of engine cylinders is retarded by a first amount and a second ignition timing of a second engine cylinder of the plurality of engine cylinders is retarded by a second amount that is different than the first amount.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts a flowchart of a method for controlling an engine system.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. In this disclosure, the term "based on," or any other variation thereof, is intended to cover, for example, "partially based on," "at least partially based on," and "based entirely on."

Figure 1:
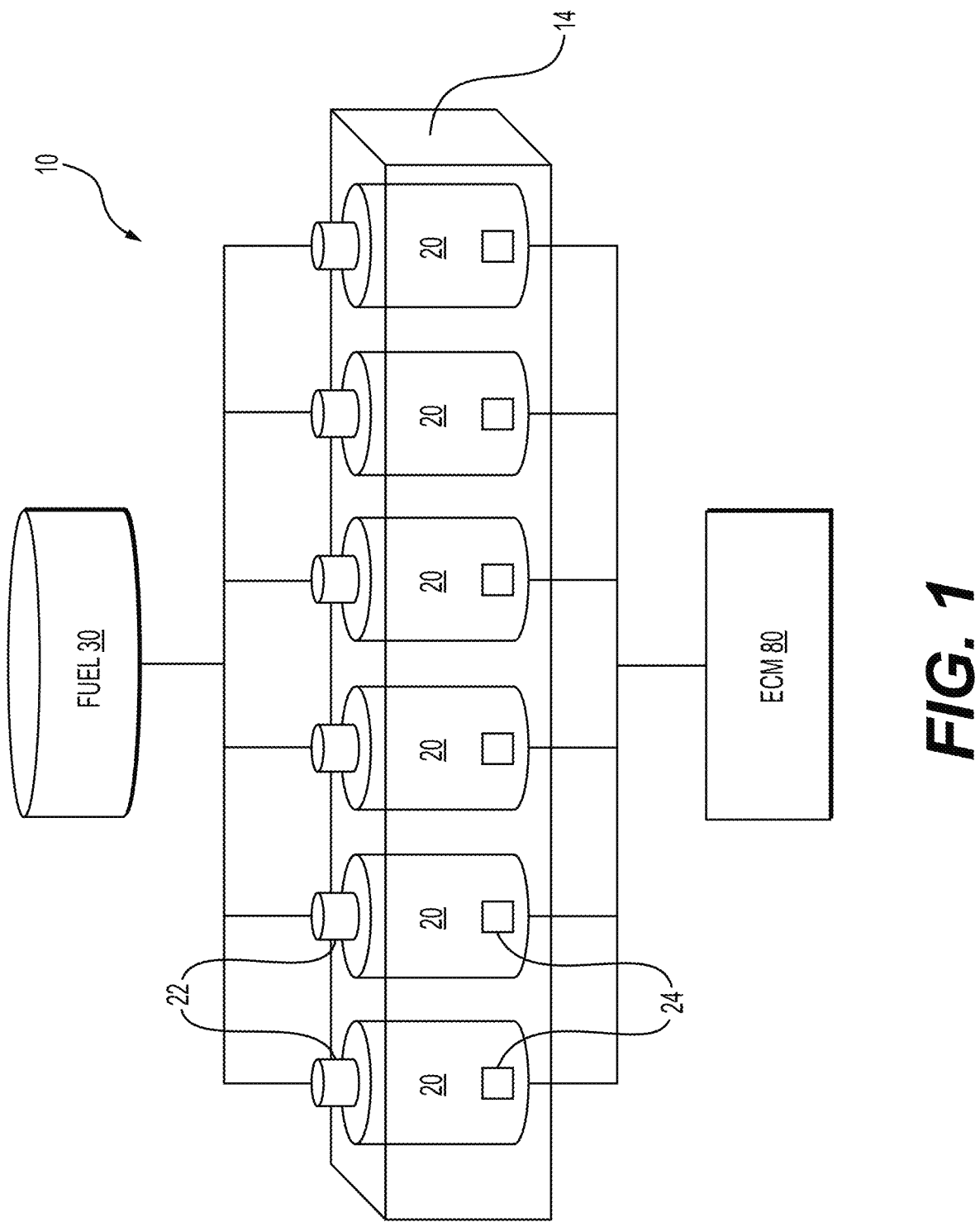
FIG. 1 depicts a schematic diagram of an exemplary engine including an exemplary plurality of engine cylinders.

FIG. 1 depicts a schematic diagram of an exemplary engine system 10 including an internal combustion engine 14 with a plurality of engine cylinders 20, a fuel source 30, and an electronic control module 80. Engine system 10 may be configured to adapt a respective ignition timing of each engine cylinder 20 included in the engine 14 collectively or individually in response to detecting a change in a knock intensity of the engine 14.

While the engine system 10 is depicted in FIG. 1 as including six engine cylinders 20, it will be understood that engine system 10 may include any number of engine cylinders 20, e.g., one engine cylinder 20, two engine cylinders 20, four engine cylinders 20, six engine cylinders 20, eight engine cylinders 20, twelve engine cylinders 20, etc. As mentioned above, each engine cylinder 20 included in the engine system 10 may include or be otherwise operatively coupled to an assembly of components that function cooperatively to combust fuel according to an engine cycle, e.g., a four-stroke engine cycle, as described above. Fuel may be received by the engine 14 from a fuel source 30, e.g., a fuel tank and/or an on-site source of fuel such as a natural gas pipeline. Fuel may be received by the engine 14 of the engine system 10 in any suitable way, such as via port injection, fumigation, or direct injection.

Figure 2:
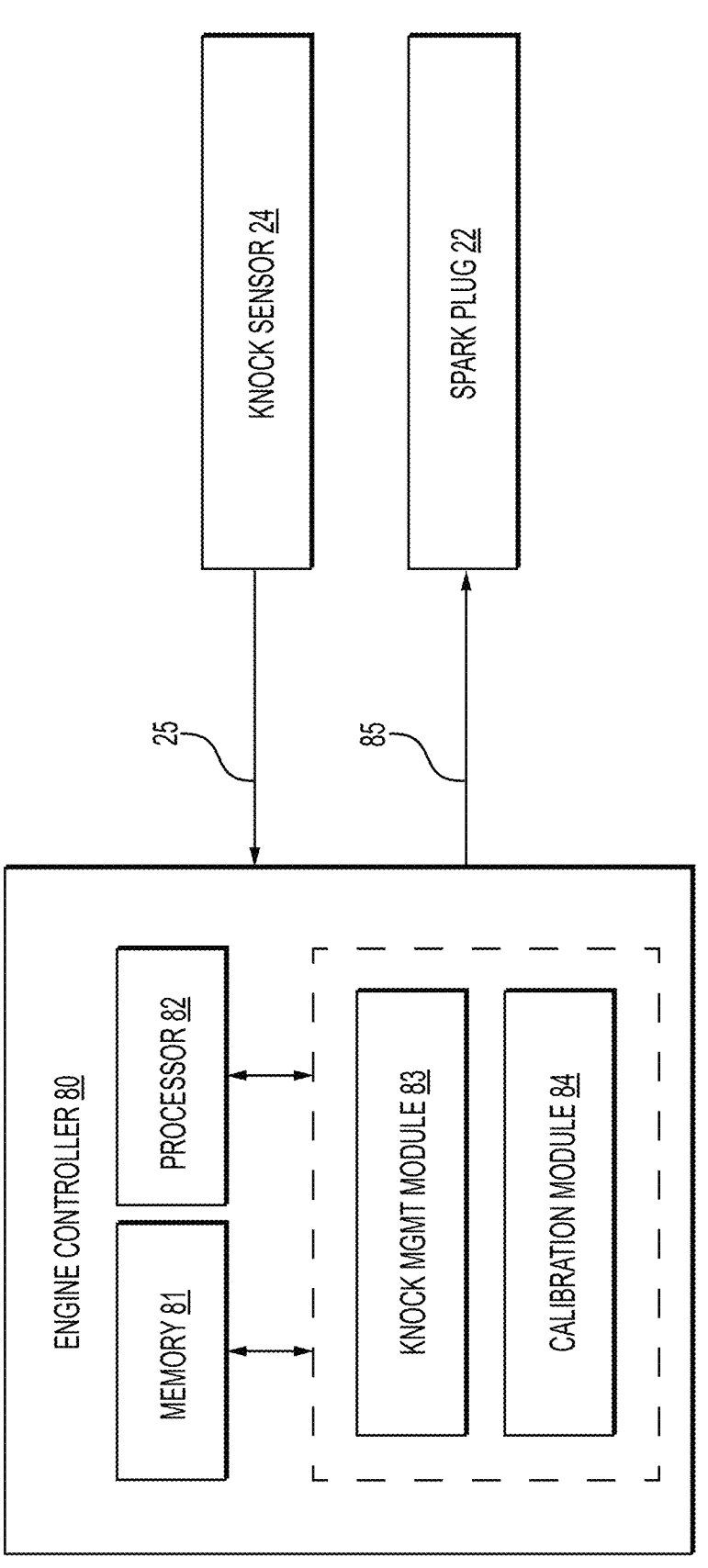
FIG. 2 depicts a block diagram of an exemplary engine controller.

Engine system 10 may include a spark plug 22 operative to ignite fuel contained within an engine cylinder 20, e.g., fuel within a combustion chamber formed with the engine cylinder 20. The spark plug 22 may be operative to ignite the fuel contained within the engine cylinder 20 at a precisely determined and/or controlled timing with respect to the operation of one or more other components of the assembly of components, such as a piston disposed within the engine cylinder 20, in order to produce torque most efficiently. The timing of the spark plug 22 may be referred to as the ignition timing of the engine cylinder 20, and may be measured in terms of crank angle, e.g., the angle of rotation of a crankshaft of engine system 10 measured from the position in which a piston of engine system 10 is at its highest point, or top dead center (TDC), e.g., TDC of the compression stroke. The ignition timing of the engine cylinder 20 may be determined or controlled by an engine controller 80, such as by generating commands for the spark plug 22, e.g., ignition timing control commands 85 (FIG. 2). For example, for a four-stroke engine cycle including 720 crank degrees, the engine controller 80 may generate and transmit ignition timing control commands 85 to each spark plug 22 included in the engine 14 for igniting fuel contained within the engine cylinders 20 at an ignition timing sometime shortly before the power stroke, e.g., between 5 and 40 degrees before a crank angle of 360 degrees.

As mentioned above, engine system 10 may additionally or alternatively include a fuel injector (not shown) operative to inject fuel from a fuel source 30 into the engine 14, such as into an engine cylinder 20. For example, each engine cylinder 20 may be operatively coupled to a separate and respective fuel injector included in the engine 14. The fuel injector may be operative to inject the fuel into the engine 14 at a precisely determined and/or controlled timing with respect to the operation of one or more other components of the assembly of components, such as a piston disposed within the engine cylinder 20, in order to produce torque most efficiently. The timing of the fuel injector may be referred to as the injection timing, or the start of injection (SOI) timing, of the fuel injector or an engine cylinder 20 operatively coupled to the fuel injector, and may be measured in terms of crank angle. The injection timing of the fuel injector may be determined or controlled by the engine controller 80, such as by generating commands for the fuel injector. For example, for a four-stroke engine cycle including 720 crank degrees, the engine controller 80 may generate and transmit commands to each fuel injector included in the engine 14 for injecting fuel into the engine 14 at an injection timing at the beginning of the intake stroke, e.g., 360 degrees before TDC.

Engine system 10 may further include one or more sensors operative to sense, measure, detect, and/or gauge one or more properties of the engine cylinder 20 or other components of engine 14. For example, the engine 14 may include a knock sensor 24 operative to detect or measure a knock intensity of the engine 14, as described in further detail below. For example, the knock sensor 24 may be a piezoelectric sensor, operative to detect knocking, in the form of vibration, within the engine cylinder 20. Or for example, the knock sensor 24 may be a pressure sensor, e.g., an in-cylinder pressure sensor (ICPS), operative to measure the pressure within the engine cylinder 20.

FIG. 2 depicts a block diagram of an exemplary engine controller 80, e.g., an electronic control module (ECM). The engine controller 80 may include a memory 81, a processor 82, or any other means for accomplishing a task consistent with the present disclosure. The memory 81 may store data and/or software operative to enable processor 82 to perform various functions. In particular, memory 81 and/or processor 82 may allow the engine controller 80 to perform any of the adaptive ignition timing functions described herein. Numerous commercially available microprocessors can be configured to perform the functions of the engine controller 80. Various other known circuits may be associated with the engine controller 80, including signal-conditioning circuitry, communication circuitry, and/or any other appropriate circuitry.

Engine controller 80 may include one or more modules operative to receive sensed inputs and generate commands and/or other signals to control the operation of the engine 10. For example, engine controller 80 may include a knock management module 83 (e.g., instructions stored in memory 81) operative to receive sensor data 25 from one or more sensors (e.g., a knock sensor 24) included in an engine cylinder 20 of the engine 10 and generate, based on the sensor data 25, ignition timing control commands 85 that may be transmitted to a spark plug 22 of the engine cylinder 20 for controlling the spark plug 22 to ignite fuel contained within the engine cylinder 20 at a particular ignition timing, as described above, e.g., to mitigate and/or optimize a knock intensity of the engine 10, as described in further detail below. The engine controller 80 may also include a calibration module 84 (e.g., instructions stored in memory 81) operative to receive sensor data 25 from one or more sensors (e.g., knock sensor 24) of the engine system 10 and generate, based on the sensor data 25, a calibration factor for the engine cylinder 20. The knock management module 83 may use the calibration factor generated for the engine cylinder 20 by the calibration module 84 when generating ignition timing control commands 85 for the engine cylinder 20.

INDUSTRIAL APPLICABILITY

The systems, apparatuses, and methods disclosed herein may find application in any machine that employs an engine 14, e.g., an internal combustion engine (ICE). In particular, the systems, apparatuses, and methods disclosed herein may be used in any machine for which it is desirable to adjust an ignition timing or an injection timing of an engine cylinder 20 of an engine 14 that may receive different types or qualities of fuel.

As mentioned above, knocking may tend to occur if fuel contained within an engine cylinder 20 that is not consumed by a flame front ignited by a spark plug 22 included in the engine cylinder 20 is subjected to sufficient heat and/or pressure. Different types or qualities of fuel may exhibit different resistances to detonating. For example, for a gaseous fuel such as natural gas, the resistance of the fuel to detonating may be measured in terms of methane number (MN). Or for example, for a liquid fuel such as unleaded gasoline or diesel, the resistance of the fuel to detonating may be measured in terms of octane number or cetane number. For the methane number scale, the higher the value for a particular fuel, the more resistant that fuel is to detonating. For the cetane number scale, the higher the value for a particular fuel, the less resistant that fuel is to detonating.

The earlier the ignition timing of an engine cylinder 20, the more likely knocking is to occur within the engine cylinder 20, e.g., because the fuel contained within the engine cylinder 20 may be given more time and/or opportunities to detonate after the spark plug 22 has fired. Thus, an engine cylinder 20 of an engine 14 designed to run on a fuel with a higher likelihood of knocking may have a comparatively more retarded ignition timing than an engine cylinder 20 of an engine 14 designed to run on a fuel with a lower likelihood of knocking, e.g., to reduce the time and/or opportunities that fuel contained within the engine cylinder 20 is given to detonate.

While retarding ignition timing may be helpful for preventing detonation, the more the ignition timing of an engine cylinder 20 of an engine 14 is retarded, the worse the fuel efficiency of the engine 14 becomes and/or the higher the exhaust temperature of the engine 14 tends to become, which may increase the cost of operating the engine 14 and/or affect the performance of an aftertreatment system operatively coupled to the engine 14.

As mentioned above, an engine 14 may receive different types or qualities of fuel that may have different levels of resistance to detonation. If an ignition timing of an engine cylinder 20 included in the engine 14 has been set to a particular crank degree that is optimal for a fuel with a particular resistance to detonation, and the engine 14 later receives a fuel with a different resistance to detonation, the engine 14 or the performance of the engine 14 may be negatively affected. As described in further detail below, the engine controller 80 may be operative to dynamically adjust or adapt the respective ignition timings of a plurality of spark plugs 22 included in an engine system 10 collectively or individually as an engine 14 included in the engine system 10 receives different types or qualities of fuel, such as by employing a knock management module 83 and/or a calibration module 84, to improve the efficiency, reliability, and/or safety of the engine 14.

Figure 3:
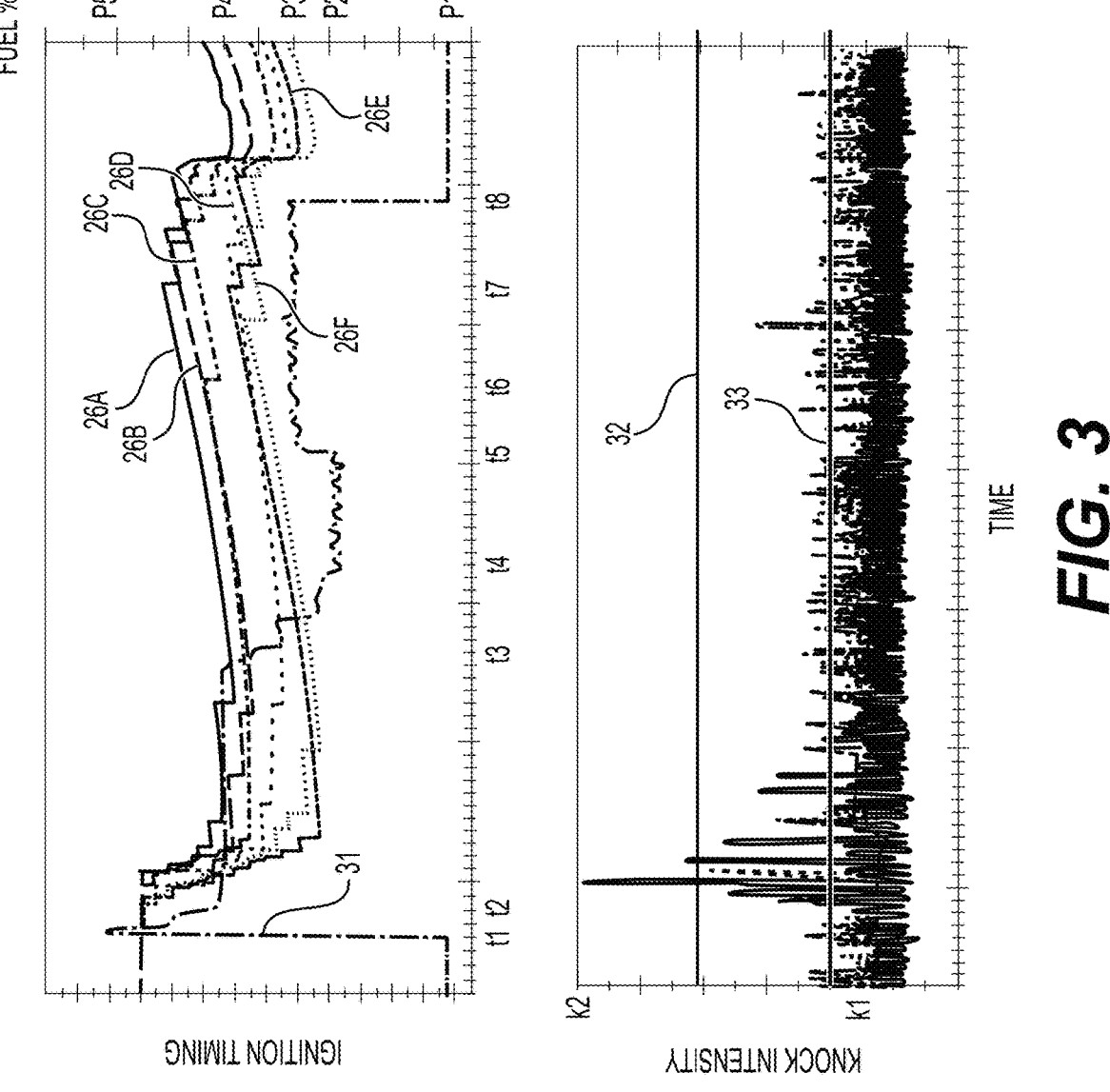
FIG. 3 depicts a chart representing an exemplary operation of an exemplary plurality of spark plugs included in a respective plurality of engine cylinders.

FIG. 3 depicts a chart representing an exemplary operation of an exemplary plurality of spark plugs 22 included in a respective plurality of engine cylinders 20 of an engine 14. In this example, the engine 14 includes six engine cylinders 20 and is operated according to a four-stroke engine cycle, as described above. In the chart of FIG. 3, for each of the six engine cylinders 20, a respective ignition timing 26A-26F is plotted over time (e.g., as measured in terms of engine cycles). Ignition timings 26A-26F are measured in terms of crank angle degrees before TDC. For example, at time $t_7$, the ignition timing 26F of a first engine cylinder 20 of the six engine cylinders 20 is more retarded than the ignition timing 26A of a second engine cylinder 20 of the six engine cylinders 20.

Also depicted in the chart of FIG. 3 is the percentage 31 of a relatively low MN fuel B mixed into a relatively high MN fuel A provided to the engine 14. FIG. 3 also shows a respective knock intensity for each of the six engine cylinders 20, both plotted over time (e.g., over various cycles of the four-stroke engine cycle of the engine 14). For example, between time zero (e.g., where the X-axis meets the Y-axis) and time $t_1$, the percentage 31 of fuel B mixed into fuel A is $P_1$%, and the respective knock intensities of the six engine cylinders 20 fluctuate mildly around an average knock intensity level of approximately $k_1$. After time $t_1$, the percentage 31 of fuel B mixed into fuel A sharply increases to approximately $P_5$%, thereby sharply decreasing the fuel mixture's resistance to detonation. Shortly thereafter, as a result, around time $t_2$, the respective knock intensities of the six engine cylinders 20 fluctuate more severely, with some nearly reaching intensity level $k_2$.

In this example, each engine cylinder 20 of the six engine cylinders 20 includes a respective knock sensor 24 operative to detect and/or measure the knock intensity of the engine cylinder 20 over time. Through communicative coupling between the knock sensor 24 and the engine controller 80, the knock intensities of the six engine cylinders 20 are provided to the engine controller 80 as sensor data 25. The engine controller 80 can then use the sensor data 25 to generate ignition timing control commands 85 for the six engine cylinders 20. In this way, the respective ignition timings of the six engine cylinders 20 can be adjusted or adapted to changes in the conditions of engine 14, such as changes in the type or quality of fuel provided to the engine 14.

For example, as depicted in FIG. 3, when the knock intensity of the engine 14 (e.g., the individual, combined, or average respective knock intensities of the six engine cylinders 20) increases around time $t_2$ due to the increase of the percentage of fuel B mixed into fuel A, the engine controller 80 is able to detect the increase in the knock intensity of engine 14 through the sensor data 25 produced by the knock sensors 24 included in the six engine cylinders 20. In response to detecting the increase of the knock intensity of the engine 14, the engine controller 80 generates ignition timing control commands 85 to retard the respective ignition timings 26A-26F of the six engine cylinders 20. As depicted in FIG. 3, by retarding the respective ignition timings of the six engine cylinders 20, the engine controller 80 is able to reduce the knock intensity of the engine 14.

In response to detecting an increase of a knock intensity of an engine 14 including a plurality of engine cylinders 20 (e.g., the six engine cylinders 20 of the example depicted in FIG. 3), the engine controller 80 may retard the respective ignition timings of the plurality of engine cylinders 20 collectively and/or individually, such as by employing the knock management module 83. For example, after detecting the increase of the knock intensity of the engine 14, the engine controller 80 may compare the knock intensity of the engine 14 to a threshold knock intensity 32. If the knock intensity of the engine 14 is greater than the threshold knock intensity 32, the engine controller 80 may retard the respective ignition timings of the plurality of engine cylinders 20 collectively (e.g., globally). As described in further detail below, the engine controller 80 may retard the respective ignition timings of the plurality of engine cylinders 20 collectively by retarding the respective ignition timings of the plurality of engine cylinders 20 at the same time, by the same amount, and/or to the same degree.

Or, if the knock intensity of the engine 14 is less than the threshold knock intensity 32, the engine controller 80 may retard the respective ignition timings of the plurality of engine cylinders 20 individually. As described in further detail below, the engine controller 80 may retard the respective ignition timings of the plurality of engine cylinders 20 individually by retarding the respective ignition timings of the plurality of engine cylinders 20 at different times, by different amounts, and or to different degrees. When the engine controller 80 retards the respective ignition timings of a plurality of engine cylinders 20 individually, the engine controller 80 may retard an ignition timing of an individual engine cylinder 20 independently of an ignition timing of any other engine cylinder 20.

The engine controller 80 (e.g., via the knock management module 83) may compare the knock intensity of the engine 14 to the threshold knock intensity 32 in various ways. For example, when comparing the knock intensity of the engine 14 to the threshold knock intensity 32, the engine controller 80 may determine a value of the knock intensity and compare the value of the knock intensity to the threshold knock intensity 32. Or for example, when comparing the knock intensity of the engine 14 to the threshold knock intensity 32, the engine controller 80 may determine a rate of change of the knock intensity and compare the rate of change of the knock intensity to a threshold knock intensity rate of change. Or for example, when comparing the knock intensity of the engine 14 to the threshold knock intensity 32, the engine controller 80 may determine a value of the knock intensity and compare the value of the knock intensity to a rolling or moving average of the knock intensity of the engine 14. However, the engine controller 80 may compare the knock intensity of the engine 14, or the increase of the knock intensity of the engine 14, to a threshold knock intensity 32 in any other appropriate way.

In the example depicted in FIG. 3, the increase of the knock intensity of the engine 14 around time $t_2$ is determined by the engine controller 80 to be greater than the threshold knock intensity 32. In response, the engine controller 80 retards the respective ignition timings 26A-26F of the six engine cylinders 20 collectively. As depicted in FIG. 3, when collectively retarding the respective ignition timings 26A-26F of a plurality of engine cylinders 20, the engine controller 80 may retard the respective ignition timings of the plurality of engine cylinders 20 at the same time, although the amount by which or the degree to which the respective ignition timing of an individual engine cylinder 20 of the plurality of engine cylinders 20 is retarded may be based on factors that are particular to the individual engine cylinder 20, such as a calibration factor determined for the individual engine cylinder 20, as described in further detail below. However, the engine controller 80 may collectively retard the respective ignition timings of a plurality of engine cylinders 20 in various ways. For example, when collectively retarding the respective ignition timings of a plurality of engine cylinders 20, the engine controller 80 may retard the respective ignition timings of the plurality of engine cylinders 20 at the same time and/or by the same amount (e.g., by the same amount of crank angle degrees) or to the same degree (e.g., to the same crank angle).

In the example depicted in FIG. 3, after spiking to approximately $P_5\%$ around time $t_1$, the percentage 31 of fuel B mixed into fuel A stabilizes at $P_4\%$ between time $t_2$ and time $t_3$, gradually decreases and then stabilizes again at approximately $P_2\%$ between time $t_4$ and time $t_5$, and then sharply increases and stabilizes again at $P_3\%$ between time $t_5$ and time $t_8$. In this example, when the percentage 31 of fuel B mixed into fuel A increases to $P_3\%$, the knock intensity of the engine 14 increases, but does not exceed the threshold knock intensity 32. In response to detecting the increase of the knock intensity of the engine 14 and determining that the increase of the knock intensity of the engine 14 is less than the threshold knock intensity 32, the engine controller 80 retards the respective ignition timings 26A-26F of the six of engine cylinders 20 individually. As depicted in FIG. 3, when individually retarding the respective ignition timings of a plurality of engine cylinders 20, the engine controller 80 may retard the ignition timing of an individual engine cylinder 20 of the plurality of engine cylinders 20 independently of any other ignition timing of any other engine cylinder 20 of the plurality engine cylinders 20. When individually retarding the respective ignition timings of a plurality of engine cylinders 20, the engine controller 80 may retard the respective ignition timings of the plurality of engine cylinders 20 at different times, and/or by different amounts or to different degrees.

When individually retarding the respective ignition timings of a plurality of engine cylinders 20, the engine controller 80 may retard the ignition timing of an individual engine cylinder 20 based on sensor data 25 generated for the individual engine cylinder 20. For example, at the same time, if a first knock sensor 24 for a first engine cylinder 20 detects a first increase of knock intensity within the first engine cylinder 20 and a second knock sensor 24 for a second engine cylinder 20 detects a second increase of knock intensity within the second engine cylinder 20 that is less than the first increase of knock intensity within the first engine cylinder 20, the engine controller 80 may retard a first ignition timing of the first engine cylinder 20 by a first amount or to a first degree and retard a second ignition timing of the second engine cylinder 20 by a second amount that is less than the first amount or to a second degree that is earlier than the first degree. Or for example, when individually retarding the respective ignition timings of a plurality of engine cylinders 20, the amount by which the engine controller 80 retards the ignition timing of an individual engine cylinder 20 may be based on a value of the knock intensity within the individual engine cylinder 20. For example, when retarding the respective ignition timings of a plurality of engine cylinders 20, the engine controller 80 may determine a first value of the knock intensity detected within a first engine cylinder 20 and a second value of the knock intensity detected within a second engine cylinder 20 that is less than the first value. In this example, because the first value is greater than the second value, the engine controller 80 may retard a first ignition timing of the first engine cylinder 20 more than a second ignition timing of the second engine cylinder 20.

There may be a desired balance to strike between retarding the ignition timing of an engine cylinder 20 of an engine 14 to reduce knocking and advancing the ignition timing of the engine cylinder 20 to improve fuel efficiency and/or lower the exhaust temperature of the engine 14. To this end, the engine controller 80 may be operative to seek a target knock intensity level 33 for an engine 14, e.g., for each engine cylinder 20 of a plurality of engine cylinders 20 included in the engine 14. To do so, the engine controller 80 may compare the target knock intensity level 33 to an average knock intensity of a plurality of engine cylinders 20 and/or to individual values of the knock intensities of individual engine cylinders 20 of the plurality of engine cylinders 20. If the target knock intensity 33 level is exceeded, the engine controller 80 may retard the respective ignition timings of one or more engine cylinders 20 of the plurality of engine cylinders 20, and if the target knock intensity level 33 is not exceeded, the engine controller 80 may advance the respective ignition timings of one or more engine cylinders 20 of the plurality of engine cylinders 20.

For example, as depicted in FIG. 3, a target knock intensity level 33 for the engine 14 has been set to a knock intensity level of $k_1$. Between time $t_3$ and time $t_6$, the target knock intensity level 33 is not exceeded by the average knock intensity of the six engine cylinders 20. Because the target knock intensity level 33 is not exceeded by the average knock intensity of the six engine cylinders 20, the engine controller 80 gradually advances the respective ignition timings of the six engine cylinders 20. In some embodiments, when advancing the ignition timing of an engine cylinder 20, the engine cylinder 20 may advance the ignition timing of the engine cylinder 20 by an incremental and/or predetermined amount during each successive cycle of the four-stroke engine cycle. In some embodiments, the amount by which the engine controller 80 advances the ignition timing of an individual engine cylinder 20 may be based on factors that are particular to the individual engine cylinder 20, such as a calibration factor determined for the individual engine cylinder 20, as described in further detail below.

After time $t_6$, in response to the percentage 31 of fuel B mixed into fuel A increasing and stabilizing at approximately $P_3$%, the average knock intensity of the six engine cylinders 20 begins to exceed the target knock intensity level 33. In response, the engine controller 80 individually retards the respective ignition timings 26A-26F of the six engine cylinders 20 when/if the knock intensity within a respective engine cylinder 20 exceeds the target knock intensity level 33. Then, after retarding the ignition timing of the engine cylinder 20, the engine controller 80 gradually advances the ignition timing of the engine cylinder 20, as described above, until the knock intensity within the engine cylinder 20 again exceeds the target knock intensity level 33, or until an upper limit on the ignition timing is reached. If the upper limit on the ignition timing is not reached, the retarding and advancing of the ignition timing of the engine cylinder 20 by the engine controller 80 may produce a characteristic chopping of the ignition timing of the engine cylinder 20, as depicted in FIG. 3.

The impact of an adjustment made to the ignition timing of one engine cylinder 20 may be different than the impact of the same adjustment made to the ignition timing of another engine cylinder 20, for various reasons. For example, differences in the geometries, wear levels, positions, etc. between a first engine cylinder 20 and a second engine cylinder 20 may cause a retardation of the ignition timing of the first engine cylinder 20 to be more effective in reducing knocking than the same retardation of the ignition timing of the second engine cylinder 20, or cause an advancement of the ignition timing of the second engine cylinder 20 to produce more knocking then the same advancement of the ignition timing of the first engine cylinder 20. Thus, as mentioned above, the amount by which the ignition timing of an individual engine cylinder 20 is retarded or advanced by the engine controller 80 may be based on factors that are particular to the individual engine cylinder 20.

For example, the engine controller 80 (e.g., via calibration module 84) may identify, determine, or generate a calibration factor for an individual engine cylinder 20. In some embodiments, a calibration factor may be determined for an individual engine cylinder 20 during one or more end-of-line (EOL) tests performed on the engine 14 before the 14 is put into field use. In some embodiments, a calibration factor may be determined for an individual engine cylinder 20 during field use of the engine 14. For example, the engine controller 80 may be operative to analyze sensor data 25 generated by a knock sensor 24 included in an engine cylinder 20 over time to determine how effective a retardation of the ignition timing of the engine cylinder 20 is in reducing knocking and generate a calibration factor for the engine cylinder 20 accordingly. Additionally or alternatively, the engine controller 80 may be operative to analyze sensor data 25 generated by a knock sensor 24 included in an engine cylinder 20 over time to determine how likely or to what degree an advancement of the ignition timing of the engine cylinder 20 results in knocking within the engine cylinder 20 and generate a calibration factor for the engine cylinder 20 accordingly. In some embodiments, an engine cylinder 20 may receive an initial calibration factor determined during one or more EOL tests conducted before field use of the engine cylinder 20, and the calibration factor for the engine cylinder 20 may be periodically updated throughout the field use of the engine cylinder 20, e.g., based on sensor data 25 generated by a knock sensor 24 included in the engine cylinder 20.

A calibration factor determined or generated for an engine cylinder 20 may be a scaling factor and/or relative to a standard or default calibration value. For example, in some embodiments, the default calibration value for any engine cylinder 20 may be 0%, and an individual engine cylinder 20 may be given a positive or negative calibration factor relative to the default calibration value of 0%, e.g., +5% or −5%. For example, in response to detecting an increase of a knock intensity of an engine 14 that exceeds a knock intensity threshold 32, as described above, the engine controller 80 may determine that the respective ignition timings of all engine cylinders 20 included in the engine 14 are to be retarded by one crank degree. In this example, the engine controller 80 then identifies a particular engine cylinder 20 included in the engine 14 that has been given a +5% calibration factor, and, instead of retarding the ignition timing of the particular engine cylinder 20 by one crank degree, the engine controller 80 retards the ignition timing of the particular engine cylinder by 1.05 crank degrees, according to the +5% calibration factor given to the particular engine cylinder 20.

In some embodiments, based at least in part on an increase of the knock intensity of an engine 10 detected by the engine controller 80, the engine controller 80 may be operative to determine and/or output a value indicative of the resistance to detonating (e.g., an methane number or an octane number) of a fuel provided to the engine 14. For example, the engine controller 80 may include data relating a particular methane number to an expected knock intensity at a particular ignition timing. In this example, using this data, if the engine controller 80 detects a knock intensity of an engine 14 that is greater than the expected knock intensity at the particular ignition timing, the engine controller 80 may be able to determine a methane number of the fuel provided to the engine 14, e.g., relative to the particular methane number. The engine controller 80 can then output the determined methane number of the fuel provided to the engine 14, such as to a control interface (e.g., a display) of a vehicle into which the engine system 10 is incorporated.

FIG. 4 depicts a flowchart of a method 100 for controlling an engine system 10, which may include an engine 14 including a plurality of engine cylinders 20 and the engine controller 80. Method 100 may be performed repeatedly during the operation the engine system 10 to adjust commands (e.g., ignition timing control commands 85) generated and/or outputted by the engine controller 80 in response to changing engine conditions (e.g., different types or qualities of fuel provided to the engine 14). Although the steps of the method 100 are shown and discussed in a particular order, it will be understood that any steps of the method 100 may be performed in any appropriate order, or simultaneously.

As depicted in FIG. 4, the method 100 may begin with a step 102, in which the engine controller 80 detects an increase of a knock intensity of the engine 14 of engine system 10. For example, as described above, the engine 14 may include a plurality of engine cylinders 20, and each engine cylinder 20 of the plurality of engine cylinders 20 may include a knock sensor 24 operative to detect knocking within the engine cylinder 20. Sensor data 25 generated by the knock sensors 24 may be provided to the engine controller 80, and the engine controller 80 may be operative to detect an increase of the knock intensity of the engine using the sensor data 25. As mentioned above, a knock sensor 24 may be a piezoelectric sensor or a pressure sensor (e.g., an in-cylinder pressure sensor or ICPS).

As depicted in FIG. 4, after detecting the increase of the knock intensity of the engine 14, the method 100 may continue with a step 104, in which the engine controller 80 compares the knock intensity of the engine 14 to a threshold knock intensity 32. In some embodiments, the threshold knock intensity 32 is a standard, default, or predetermined value. In some embodiments, the threshold knock intensity 32 is updated throughout the operation of the engine 14 and may be based at least in part on a rolling or moving average of knock intensities detected within the engine 14 (e.g., within one or more engine cylinders 20 included in the engine 14). As discussed above, if the knock intensity of the engine 14 is greater than the threshold knock intensity 32, the engine controller 80 may collectively retard the respective ignition timings of each engine cylinder 20 included in the plurality of engine cylinders 20. Or, if the knock intensity of the engine 14 is less than the threshold knock intensity 32, the engine controller 80 may retard the respective ignition timings of the plurality of engine cylinders 20 on an individual, engine cylinder-by-engine cylinder basis.

For example, if the knock intensity of the engine 14 is greater than the threshold knock intensity 32, the engine controller 80 may collectively retard the respective ignition timings of the plurality of engine cylinders 20 at the same time, as described above. When collectively retarding the respective ignition timings of a plurality of engine cylinders 20, the amount or degree to which the ignition timing of an individual engine cylinder 20 of the plurality of engine cylinders 20 is retarded may be based on a calibration factor determined for the individual engine cylinder 20, or the amount or degree to which the ignition timing of each engine cylinder 20 is retarded may be predetermined and/or the same.

If the knock intensity of the engine 14 is less than the threshold knock intensity 32, the engine controller 80 may individually retard the respective ignition timings of the plurality of engine cylinders 20. When individually retarding the respective ignition timings of a plurality of engine cylinders 20, the engine controller 80 may retard the ignition timing of a particular engine cylinder 20 when the knock intensity within the particular engine cylinder 20 exceeds a target knock intensity 33. When individually retarding the respective ignition timings of a plurality of engine cylinders 20, the engine controller 80 may retard the ignition timing of a particular engine cylinder 20 independently of the ignition timing of any other engine cylinder 20. For example, the engine controller 80 may retard the ignition timing of a particular engine cylinder 20 at a different time, by a different amount, or to a different degree than the ignition timing of any other engine cylinder 20. When individually retarding the respective ignition timings of a plurality of engine cylinders 20, the amount or degree to which the ignition timing of an individual engine cylinder 20 is retarded may be based on a calibration factor determined for the individual engine cylinder 20, as described above, or the amount or degree to which the ignition timing of the individual engine cylinder 20 is retarded may be predetermined.

As depicted in FIG. 4, after comparing the knock intensity of the engine to the threshold knock intensity 32, the method 100 may continue with a step 106, in which the engine controller 80 retards a first ignition timing of a first engine cylinder 20 of the plurality of engine cylinders 20 by a first amount, and a step 108, in which the engine controller 80 retards a second ignition timing of a second engine cylinder 20 of the plurality of engine cylinders 20 by a second amount that is less than the first amount.

For example, as described above, if the knock intensity of the engine 14 is greater than the knock intensity threshold 32, although the first amount and the second amount are different, the first ignition timing and the second ignition timing may be collectively retarded during the same cycle of a four-stroke engine cycle. The first amount may be based on a first calibration factor identified or generated for the first engine cylinder 20 and the second amount may be based on a second calibration factor identified or generated for the second engine cylinder 20, as described above. Or for example, if the knock intensity of the engine 14 is greater than the knock intensity threshold 32, the engine controller 80 may collectively retard the first ignition timing and second ignition timing to the same crank angle, although the first amount and the second amount are different because the first ignition timing was previously more advanced than the second ignition timing.

Or for example, if the knock intensity of the engine 14 is less than the knock intensity threshold 32, the engine controller 80 may individually retard the first ignition timing and the second ignition timing by different amounts, as well as to different crank angles or at different times, as described above. The first amount may be based on a first calibration factor identified or generated for the first engine cylinder 20 and the second amount may be based on a second calibration factor identified or generated for the second engine cylinder 20, as described above.

As depicted in FIG. 4, the method 100 may continue with a step 110, in which the engine controller 80 advances the first or second ignition timing until a target knock intensity

33 is reached, or until an upper limit on the first or second ignition timing is reached. As described above, the engine controller 80 may advance the first or second ignition timing by an incremental and/or predetermined amount during each successive cycle of the four-stroke engine cycle. The amount by which the engine controller 80 advances the first or second ignition timing may be based on a first calibration factor identified or generated for the first engine cylinder 20 or a second calibration factor identified or generated for the second engine cylinder 20, respectively.

In collectively and individually adjusting the ignition timings of a plurality of engine cylinders 20 included in an engine 14, the engine controller 80 is able to adjust the operation of the engine 14 in response to different types and qualities of fuel both quickly and granularly, such that the engine 14 is able to reduce wear due to knocking and avoid knocking-induced shut downs. By setting a target knock intensity level 33 and advancing the respective ignition timings of a plurality of engine cylinders 20 included in an engine 14, the engine controller 80 is able to improve the fuel efficiency of the engine 14 and prevent the exhaust temperature of the engine 14 from becoming undesirably high. By using sensor data 25 generated by pressure sensors disposed within each engine cylinder 20 of a plurality of engine cylinders 20 included an engine 14, the engine controller 80 is able to reliably detect and measure knocking within each engine cylinder 20.

Although the systems and methods disclosed herein are often described as reducing and/or managing knocking within an engine 14 by collectively and/or individually adjusting the ignition timings of a plurality of engine cylinders 20 included in the engine 14, it will be understood and appreciated that the systems and methods disclosed herein may be alternatively or additionally capable of reducing and/or managing knocking within an engine 14 by collectively and/or individually adjusting the injection timings of a plurality of engine cylinders 20 included in the engine 14. For example, in response to detecting an increase of a knock intensity of an engine 14 including a plurality of engine cylinders 20, an engine controller 80 may compare the knock intensity of the engine 14 to a threshold knock intensity 32, as described above. If the knock intensity of the engine 14 is greater than the threshold knock intensity 32, the engine controller 80 may collectively retard the respective injection timings of each engine cylinder 20 included in the plurality of engine cylinders 20, similar to the ways in which the engine controller 80 may collectively retard the respective ignition timings of each engine cylinder 20 included in the plurality of engine cylinders 20, as described above. Or for example, if the knock intensity of the engine 14 is less than the threshold knock intensity 32, the engine controller 80 may retard the respective injection timings of the plurality of engine cylinders 20 on an individual, engine cylinder-by-engine cylinder basis, similar to the ways in which the engine controller 80 may retard the respective ignition timings of each engine cylinder 20 included in the plurality of engine cylinders 20 on an individual, engine cylinder-by-engine cylinder basis, as described above. Similar to the ways in which the engine controller 80 may collectively or individually retard the respective ignition timings of the engine cylinders 20, as described above, whether the engine controller 80 collectively or individually retards the respective injection timings of the engine cylinders 20, the engine controller 80 may retard a first injection timing of a first engine cylinder 20 of the plurality of engine cylinders 20 by a first amount and retard a second injection timing of a second engine cylinder 20 of the plurality of engine cylinders 20 by a second amount that is different than the first amount. After collectively or individually retarding the respective injection timings of the engine cylinders 20, the engine controller 80 may advance the respective injection timings of one or more engine cylinders 20 included in the plurality of engine cylinders 20 until a target knock intensity 33 is reached, or until an upper limit on the respective injection timings of the one or more engine cylinders 20 is reached. In reducing and/or managing knocking within an engine 14, the engine controller 80 may collectively and/or individually adjust either or both of the respective ignition timings of a plurality of engine cylinders 20 included in the engine 14 and the respective injection timings of the plurality of engine cylinders 20 included in the engine 14, such that the engine controller 80 may be capable of reducing and/or managing knocking within an engine 14 fueled with different types of fuels, such as a dual fuel engine or an engine fueled with hybrid fuel mixtures.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. An engine system, comprising:

an engine comprising a plurality of engine cylinders; and a controller operative to:

control a respective ignition timing for each engine cylinder of the plurality of engine cylinders;

detect an increase of a knock intensity of the engine;

after detecting the increase of the knock intensity of the engine, compare the knock intensity of the engine to a threshold knock intensity;

in response to determining that the knock intensity of the engine is greater than the threshold knock intensity, collectively retard the respective ignition timings for the plurality of engine cylinders by substantially the same amount; and in response to determining that the knock intensity of the engine is less than the threshold knock intensity, retard a first ignition timing of a first engine cylinder of the plurality of engine cylinders by a first amount independently of a second ignition timing of a second engine cylinder of the plurality of engine cylinders.

2. The engine system of claim 1, wherein the controller is further operative to:

determine a calibration factor for the first engine cylinder; and in response to determining that the knock intensity of the engine is less than the threshold knock intensity, retard the first ignition timing of the first engine cylinder by the first amount based at least in part on the calibration factor.

3. The engine system of claim 2, wherein the controller is further operative to, in response to determining that the knock intensity of the engine is greater than the threshold knock intensity, retard the respective ignition timing for each engine cylinder of the plurality of engine cylinders by a predetermined amount.

4. The engine system of claim 1, wherein the increase of the knock intensity of the engine is detected by a pressure sensor.

5. The engine system of claim 4, wherein the pressure sensor is disposed within the first engine cylinder.

6. The engine system of claim 1, wherein the controller is further operative to:

determine a value of the knock intensity of the engine; and if the knock intensity of the engine is less than the threshold knock intensity, retard the first ignition timing of the first engine cylinder by the first amount based at least in part on the value of the knock intensity of the engine.

7. The engine system of claim 1, wherein the controller is further operative to, in response to determining that the knock intensity of the engine is less than the threshold knock intensity, retard a second ignition timing of a second engine cylinder of the plurality of engine cylinders by a second amount that is different than the first amount.

8. The engine system of claim 7, wherein:

detecting the increase of the knock intensity of the engine further comprises detecting a first increase of the knock intensity within the first engine cylinder and a second increase of the knock intensity within the second engine cylinder; and the controller is further operative to retard the first ignition timing by the first amount and the second ignition timing by the second amount based at least in part on the first increase of the knock intensity and the second increase of the knock intensity, respectively.

9. The engine system of claim 8, wherein the first increase of the knock intensity is detected by a first pressure sensor disposed within the first engine cylinder and the second increase of the knock intensity is detected by a second pressure sensor disposed within the second engine cylinder.

10. The engine system of claim 1, wherein the controller is further operative to, in response to determining that the knock intensity of the engine is less than the threshold knock intensity, after retarding the first ignition timing of the first engine cylinder by the first amount, advance the first ignition timing until a target knock intensity of the engine is reached.

11. An engine controller, comprising a processor and a memory storing instructions for causing the processor to:

detect an increase of a knock intensity of an engine;

after detecting the increase of the knock intensity of the engine, compare the knock intensity of the engine to a threshold knock intensity;

in response to determining that the knock intensity of the engine is greater than the threshold knock intensity, collectively retard respective ignition timings for a plurality of engine cylinders included in the engine by substantially a first amount; and in response to determining that the knock intensity of the engine is less than the threshold knock intensity, retard a first ignition timing of a first engine cylinder of the plurality of engine cylinders by a second amount that is less than the first amount.

12. The engine controller of claim 11, wherein the memory further stores instructions for causing the processor to, in response to determining that the knock intensity of the engine is less than the threshold knock intensity, after retarding the first ignition timing of the first engine cylinder by the second amount, advance the first ignition timing until a target knock intensity of the engine is reached.

13. The engine controller of claim 11, wherein the memory further stores instructions for causing the processor to:

determine a calibration factor for the first engine cylinder; and in response to determining that the knock intensity of the engine is less than the threshold knock intensity, retard the first ignition timing of the first engine cylinder by the second amount based at least in part on the calibration factor.

14. The engine controller of claim 11, wherein the memory further stores instructions for causing the processor to:

determine a value of the knock intensity of the engine; and in response to determining that the knock intensity of the engine is less than the threshold knock intensity, retard the first ignition timing of the first engine cylinder by the second amount based at least in part on the value of the knock intensity of the engine.

15. The engine controller of claim 11, wherein the memory further stores instructions for causing the processor to, based at least in part on the increase of the knock intensity of the engine, determine and output a methane number, an octane number, or a cetane number of a fuel provided to the engine.

16. A method for controlling an engine, the method comprising:

detecting a first increase of an average knock intensity of a plurality of engine cylinders included in the engine;

after detecting the first increase of the average knock intensity of the plurality of engine cylinders, determining that the average knock intensity of the engine is less than a threshold knock intensity;

in response to determining that the average knock intensity of the plurality of engine cylinders is less than the threshold knock intensity, retarding respective ignition timings for the plurality of engine cylinders, wherein a first ignition timing of a first engine cylinder of the plurality of engine cylinders is retarded by a first amount and a second ignition timing of a second engine cylinder of the plurality of engine cylinders is retarded by a second amount that is different than the first amount;

detecting a second increase of the average knock intensity of the plurality of engine cylinders;

after detecting the second increase of the average knock intensity of the plurality of engine cylinders, determining that the average knock intensity of the plurality of engine cylinders included in the engine is greater than the threshold knock intensity; and in response to determining that the average knock intensity of the plurality of engine cylinders is greater than the threshold knock intensity, collectively retarding the respective ignition timings for the plurality of engine cylinders by substantially the same amount.

17. The method of claim 16, further comprising detecting the first and second increases of the average knock intensity of the plurality of engine cylinders included in the engine with a pressure sensor.

18. The method of claim 16, further comprising determining a value of the average knock intensity of the plurality of engine cylinders included in the engine and wherein the first and second amounts are based at least in part on the value of the average knock intensity of the plurality of engine cylinders included in the engine.

19. The method of claim 16, further comprising determining a first calibration factor for the first engine cylinder and a second calibration factor for the second engine cylinder and wherein the first and second amounts are further based at least in part on the first and second calibration factors, respectively.

20. The method of claim 16, further comprising, based at least in part on the first and second increases of the average knock intensity of the plurality of engine cylinders included in the engine, determining and outputting a methane number of a fuel injected into the engine.

* * * * *